United States Patent [19]
Wolff

[11] 3,922,560
[45] Nov. 25, 1975

[54] TWO FREQUENCY STIMULATED SPIN FLIP

[75] Inventor: Peter A. Wolff, Cambridge, Mass.

[73] Assignee: Massachusetts Institute of Technology, Cambridge, Mass.

[22] Filed: Jan. 26, 1973

[21] Appl. No.: 326,923

[52] U.S. Cl. .............................. 307/88.3; 321/69 R
[51] Int. Cl.² ......................................... H02M 5/06
[58] Field of Search ..................... 307/88.3; 321/69

[56] References Cited
UNITED STATES PATENTS
3,789,235  1/1974  Bridges et al. ..................... 307/88.3

OTHER PUBLICATIONS
Brown et al., "Physical Review Letters," August, 1972, pp. 362–364.
Bridges et al., "Physical Review Letters," August, 1972, pp. 359–361.

*Primary Examiner*—R. V. Rolinec
*Assistant Examiner*—Darwin R. Hostetter
*Attorney, Agent, or Firm*—Arthur A. Smith, Jr.; Martin M. Santa; John N. Williams

[57] ABSTRACT

A mixing material of n-doped Indium Antimonide is permeated with a magnetic field and stimulated by radiation with components of two frequencies $f_1$ and $f_2$, the difference frequency $f_0 = f_1 - f_2$ corresponding to the spin-flip transition of the mobile electrons, the radiation components being oriented so that the vector product of their respective electric vectors is angled to the magnetic field, thereby resonantly driving the electrons in precession about the magnetic field at frequency $f_0$ and causing them to act as oscillating magnetic dipoles emitting radiation of frequency $f_0$. A CO laser is the source of radiation of frequency $f_1$, and radiation of frequency $f_2$ is generated in a Raman laser having lasing material of Indium Antimonide stimulated by radiation of frequency $f_1$ and generating stimulated Raman radiation of frequency $f_2$, the Raman laser being permeated by a controllable magnetic field of the same strength as the mixing material for simultaneous tracked tuning of the Raman laser and the spin-flip transition.

23 Claims, 1 Drawing Figure

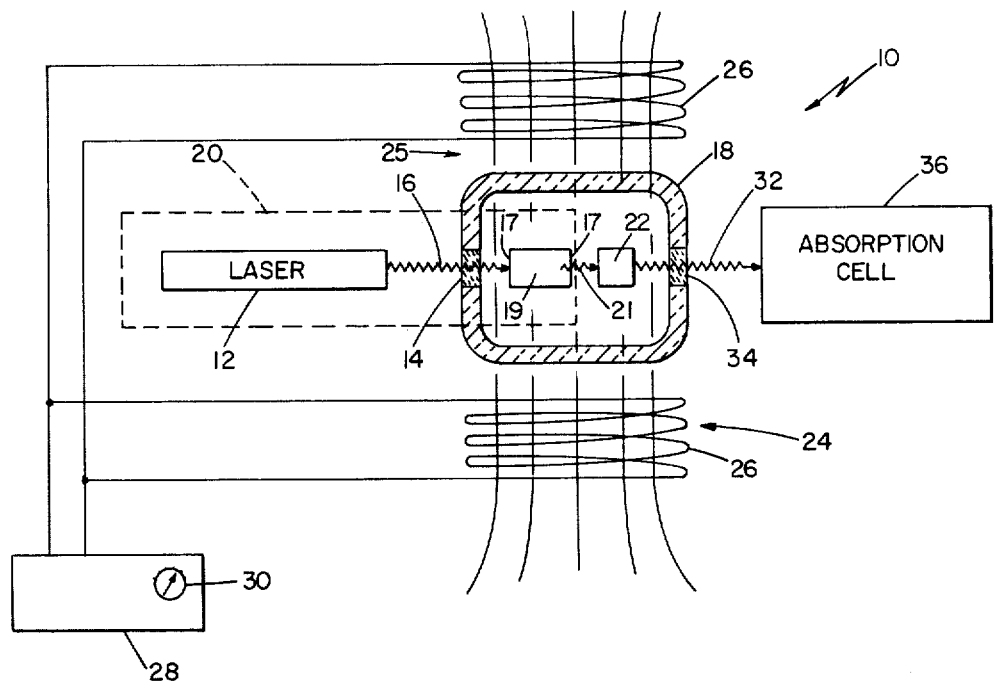

TWO FREQUENCY STIMULATED SPIN FLIP

The invention herein described was made in the course of work performed under a contract with the Department of the Air Force, U.S. Department of Defense.

BACKGROUND OF THE INVENTION

This invention relates to generating radiation, to the flipping of spin systems in a magnetic field, and to Raman processes.

P.A. Wolff (*Phys. Rev. Letters* 16, p. 225 (1966)) discusses enhancement of cross sections of various processes in semiconductors with stimulation near the band gap energy. Y. Yafet (*Phys. Rev.* 152, p. 859, Dec. 9, 1966) has discussed the theory of Raman scattering by processes including spin-flip in Indium Antimonide. P.A. Wolff (IEEE Journal of Quantum Electronics QE-2, p. 659, Sept. 1966) has discussed tuning a Raman laser by adjustment of the magnetic field permeating the lasing material. Slusher et al. (*Phys. Rev. Letters* 18, p. 77, Jan. 16, 1969) has given data on Raman scattering by the spin-flip process in Indium Antimonide. P.A. Fluery et al. (U.S. Pat. No. 3,479,453) have described a Raman laser using Indium Antimonide and tunable by changing a magnetic field.

SUMMARY OF THE INVENTION

The invention features providing a mixing material (e.g., n-doped Indium Antimonide) containing charge carriers with magnetic moments and resonant in a spin-flip transition, permeating the mixing material with a magnetic field, applying to the mixing material stimulating, coherent radiation with components of two frequencies $f_1$ anf $f_2$, the difference frequency $f_o = f_1 - f_2$ corresponding to the spin-flip transition of the carriers, the radiation components being oriented so that the vector product of their respective electric vectors is angled to the magnetic field, thereby resonantly driving the carriers in precession about the magnetic field at frequency $f_o$ and causing them to act as oscillating magnetic dipoles, and coupling an output of frequency $f_o$ from the precessing dipoles to equipment responsive thereto for use.

Preferred embodiments of the invention feature a mixing material wherein the plasma frequency (referring to the propagation characteristics of the mixing material) is less than the output frequency $f_o$; charge carriers having magnetic moments greater than 10 times that of free electrons; carriers having Raman coupling cross sections greater than 1000 times that of free electrons; carriers with a spin-flip resonance less than 0.03 cm$^{-1}$ in width; mobile carriers in a non-degenerate energy band of a narrow gap semiconductor crystal and preferably electrons is an n-doped. III–V type semiconductor such as Indium Antimonide; using stimulating radiation with frequency components $f_1$ and $f_2$ plane polarized at right angles to one another and propagating in a common direction at right angles to the magnetic field; employing $f_1$ radiation at an energy slightly less than the band gap of the mixer semiconductor, preferably by using a CO laser as the source of $f_1$ in conjunction with mixing material of Indium Antimonide; employing as a source of stimulating radiation a Raman laser having lasing material similar to the mixing material, this laser stimulated by radiation of frequency $f_1$ and generating stimulated Raman radiation of frequency $f_2$, the Raman laser being permeated by a controllable magnetic field of the same strength as the mixing material for simultaneous tracked tuning of the Raman laser and the spin-flip transition; and employing the above system as a source of far infrared radiation.

The invention advantageously provides a relatively high intensity, continuously tunable, coherent source of infrared radiation.

BRIEF DESCRIPTION OF THE DRAWING

The sole figure shows diagrammatically a far infrared source according to the invention as used in spectroscopic analysis.

DESCRIPTION OF PREFERRED EMBODIMENT

Referring to the Figure, apparatus 10 according to the invention includes radiation mixer 22 which generates a beam 32 of far infrared radiation of frequency $f_o$ and is composed in general of mixing material containing charge carriers that have magnetic moments and are resonant in a spin-flip, magnetic dipole transition with transition energy $E_t$ dependent on the magnetic field in the material and composed specifically of n-doped Indium Antimonide semiconductor crystal (transparent at frequencies $f_1$ and $f_2$). Stimulating radiation source 20 includes Raman laser 19 having lasing material similar to the mixing material in mixer 22, and laser 12 (in the preferred embodiment, a CO laser radiating at 5 $\mu$m.) arranged to direct radiation in beam 16 into Raman laser 19 with reflection modifying coatings on faces 17. Source 20 emits beam 21 of stimulating radiation colinear with beam 16 which illuminates mixer 22. Magnet 24 provides a magnetic field 25 (typically in a range up to 100 kilogauss) directed perpendicular to the direction of propagation of beams 16 and 21, and uniformly permeating Raman laser 19 and mixer 22. Coils 26 of magnet 24 are powered by d.c. source 28, which includes controls 30 for adjusting the field strength of magnet 24. Mixer 22 and Raman laser 19 are supported within and maintained cold (4° K. in the preferred embodiment) by cryogenic system 18. Optical element 14, transmissive to radiation generated by laser 12, admits beam 16 into cryogenic system 18. Optical element 34, transmissive to far infrared output radiation of frequency $f_o$, receives radiation emitted by mixer 22 and transmits it to absorption cell 36 for use in spectroscopic analysis.

In operation, coherent, plane polarized radiation of frequency $f_1$ emitted by laser 12 in beam 16 penetrates into Raman laser 19 where it interacts with the charge carriers therein. The result of this interaction is to produce Raman-scattered radiation of frequency $f_2$ less than $f_1$ by an amount $f_o$, equivalent to the energy of the spin-flip transition. (I.e. $f_o = E_t/h$) Laser 12 is operated at a level to induce stimulated Raman radiation in Raman laser 19. It may be noted that the Raman radiation of frequency $f_2$ generated in this manner is inherently coherent and polarized at right angles to the incident radiation. The path of the incident beam 16 in Raman laser 19 is long compared to the cross sectional dimensions of the beam and the Raman radiation will be predominantly in a beam colinear with the incident beam. A portion of the radiation incident on Raman laser 19 in beam 16 passes through laser 19 without interaction so that beam 21 contains plane polarized radiation of frequency $f_1$ and radiation of frequency $f_2$, less than $f_1$ by an amount $f_o$, and plane polarized at right angles to the radiation of frequency $f_1$. The two radiation components in beam 21 illuminate mixer 22 and interact jointly with the carriers of mixer 22, driving them in a precessional motion about the field at a frequency $f_o$ equal to the difference between $f_1$ and $f_2$. The spin-flip transition energy of the carriers $E_t$ corresponds to the frequency difference $(f_1-f_2)$ so that the precession is driven resonantly and is therefore strongly enhanced. The precessional motion of the carriers causes them to act as oscillating magnetic dipoles which emit radiation output differing in frequency from each of the stimulating frequencies and in particular at frequency $f_o$. Typically $f_o$ will be in the far infrared.

It has been found that the strength of the joint interaction of the two stimulating radiations at frequencies $f_1$ and $f_2$ driving the precession of the carriers in the mixer varies as the vector product of the electric field vectors of the two stimulating radiations. (See further Brown, T. L. and Wolff, P. A.: Theory of Resonant, Far Infrared Generation in In Sb, *Phys. Rev. Letters* 29 p. 362, Aug. 7, 1972, incorporated herein by reference.) It is accordingly necessary to polarize the stimulating radiations so that this vector product is not always zero. It has also been found that the interaction varies as the sine of the angle between the magnetic field and the abovementioned vector product. It is therefore necessary that the field be oriented at an angle to the vector product and preferably at right angles thereto. An advantageous orientation of the electric vectors and field is obtained in the preferred embodiment where the stimulating radiations are plane polarized at right angles to one another and propagate colinearly in a direction perpendicular to the field.

The preferred embodiment, because it employs a Raman laser with lasing material similar to the mixing material of the mixer, may be tuned with advantageous simplicity. When the magnetic field is varied by adjusting controls 30, the spin-flip transition energy, which is dependent on the magnetic field, is equally changed in the mixer and in the Raman laser, so that tracked tuning of the source 20 and the mixer is effected, the frequency difference $(f_1-f_2)$ of the radiations emitted by the Raman laser being thus variable and at all times corresponding to the spin-flip transition energy $E_t$ in the mixer. Thus by manipulating controls 30, the output frequency $f_o$ may be adjusted to a desired value while maintaining the condition for resonantly driving the carriers of the mixer.

Turning to the composition of the mixing and Raman lasing material, it has been found that the desired action of the mixer and of the Raman laser is enhanced when the magnetic moment of the carriers therein is large and especially when the magnetic moment is greater than 10 times that of a free electron. It has also been found that the desired action of the mixer and Raman laser is enhanced when the Raman coupling cross-section of the carriers therein is large and especially when the cross-section is greater than 1000 times that of a free electron. These enhancing effects may be advantageously realized, as in the preferred embodiment, by employing as mixing and lasing materials semiconductor crystals with a band gap between the valence and conduction bands less than 0.5 ev.

It has further been found that when employing such crystals, the desired action of the mixer and the Raman laser is enhanced when the radiation stimulating the Raman laser and the radiation of higher frequency stimulating the mixer (designated $f_1$ in the above description) has a photon energy less than but nearly equal to the gap energy of the crystal. This enhancement may be advantageously realized, as in the preferred embodiment, by employing a CO laser as the source of frequency $f_1$ in combination with crystals of Indium Antimonide as the Raman lasing and mixing material.

It has also been found that the desired action of the mixer is enhanced when the carriers therein have a narrow spinflip resonance, especially when the resonance has a width less than 0.03 cm$^{-1}$. Narrow resonance with consequent enhancement may be realized, as in the preferred embodiment, by employing as mixer material a semiconductor crystal wherein the carriers lie in a non-degenerate energy band, as for example, type III–V, n-doped semiconductors, where mobile electron carriers lie in a non-degenerate conduction band, and especially by employing such a crystal which is microscopically homogenious as is the n-doped Indium Antimonide crystal. Maintaining the crystal cold, as in the preferred embodiment, reduces the width of resonance and gives further enhancement and is further beneficial in that it promotes a distribution of spin states strongly biased to the lower state.

The mixing process is generally described by an effective non-linear coefficient $$C(f_o) = \frac{\frac{e^2}{8\pi^2 h^2} \frac{n_o \mu^*}{m_s} \left[ \frac{f_1 E_G}{(E_G/h)^2 - f_1^2} \right] \frac{1}{f_1 f_2}}{(f_o - E_t/h + i\gamma/2)}$$

where $n_o$ is the electron density, $\mu^*$ is the magnetic moment of the electrons, $m_s$ is the spin effective mass of the electrons, and $\gamma$ is the spin transition line width (full width in cycles at half maximum). The enhancement effects obtained from large magnetic moment, small effective mass, and operation with $f_o$ equal to $(E_t/h)$ and with $f_1$ nearly equal to $(EG/h)$ are apparent from the formula.

It has also been found advantageous to have the plasma frequency in the mixer material less than the output radiation frequency $f_o$ to permit the transmission of the generated radiation through the mixer material. The plasma frequency depends primarily on the concentration of mobile charge carriers in the material, and when, as in the preferred embodiment, a semiconductor is employed as the mixer material, the plasma frequency can be conveniently established by controlling the level of doping. Doping level may also be employed to control phase matching in the crystal. The advantageous doping level will depend on the frequency or the range of frequencies to be generated by the mixer, but in any case may be readily calculated by reference to well known formulas. It may also be advantageous to dope the Raman laser medium at a higher level than the mixer material to enhance the production of frequency $f_2$.

In summary of the above, a number of factors serve to enhance the effect obtained and serve to guide in the choice of materials used in the mixing material. On one hand, the material must be effectively transparent both to the incident radiation (frequencies $f_1$ and $f_2$) and the output frequency $f_o$. With crystalline materials the upper frequency limit for $f_o$ has relation to the frequency at which the optical modes of the crystalline lattice becomes excited, this being for Indium Antimonide in the region of 57 $\mu$m. wave length, a wave length which is strongly absorbed by the material. The lower frequency bound is dependent upon the electron density referred to generally as "plasma frequency" which varies to some extent upon the density of the electrons.

Both large magnetic moments and adequate Raman coupling are required for enhancement of the effects. In n-carrier type, narrow gap, semiconductor crystals, these properties go hand in hand, for example, in Lead Telluride (Pb Te), Cadmium Mercury Telluride (Cd Hg Te) and Lead Tin Telluride (Pb Sn Te). Other materials having high magnetic moment (e.g., rare earth materials, for example, dysprosium of magnetic moment $g=17$) may be found useful for certain applications though lower Raman coupling obtains.

Furthermore, for enhancement, the pumping frequencies should be equal to the band gap of the material, i.e., the higher pumping frequency should be as close to but less than the band gap as possible.

Finally the driving of the electron spins becomes more efficient if the spin line width is narrow. Thus the narrow line width of the Indium Antimonide serves to enhance the effect. It is anticipated that with advances in crystal growing technology, other materials with valuable properties will become available. Thus by making Cadmium Mercury Telluride alloy free of inhomogeneities (inhomogeneities leading to large line width) its large magnetic moment and its gap matched to the $CO_2$ laser may become useful.

Still further embodiments will occur to those skilled in the art and are within the scope of the following claims.

I claim:

1. Apparatus for driving equipment in response to spinflip of charge carriers comprising,
    a mixer composed of mixing material containing therein charge carriers with magnetic moments and resonant in a spin-flip, magnetic dipole transition with energy $E_t$ dependent on the magnetic field permeating said mixer,
    a cooling system for maintaining said mixer cold, to bias said carriers into their lower spin state,
    a magnet arranged to permeate said mixer with a magnetic field,
    a source of a first coherent stimulating radiation of frequency $f_1$ and a second coherent stimulating radiation of frequency $f_2$, less than $f_1$ the difference between $f_1$ and $f_2$ corresponding to said transition energy $E_t$, said source being arranged to concurrently illuminate said mixer with both said stimulating radiations polarized such that their respective electric vectors have a vector product angled to said magnetic field, thereby resonantly driving said carriers in precession about said field at frequency $f_o = f_1 - f_2$ causing said carriers to act as oscillating magnetic dipoles, and
    equipment coupled to be responsive to an output at frequency $f_o$ from said precessing carriers.

2. Apparatus as claimed in claim 1, said first and second stimulating radiations being plane polarized at right angles to one another.

3. Apparatus as claimed in claim 1, said first and said second stimulating radiations propagating in a common direction at right angles to said magnetic field.

4. Apparatus as claimed in claim 1, the plasma frequency in said mixing material being less than output frequency $f_o$.

5. Apparatus as claimed in claim 1, including controls operatively connected to effect variation of the difference between frequencies $f_1$ and $f_2$ emitted by said source and to effect by changing said field corresponding variation of the transition energy $E_t$ in said mixer, thereby to tune frequency $f_o$ to a desired value while resonantly driving said carriers in said mixer.

6. Apparatus as claimed in claim 5, said source including a Raman laser with lasing material therein of material similar to said mixing material, said lasing material being responsive to stimulation by radiation of frequency $f_1$ to emit stimulated Raman radiation of frequency $f_2$.

7. Apparatus as claimed in claim 6, said magnet being arranged to permeate said lasing material with a magnetic field of the same strength as that permeating said mixing material for simultaneous tracked tuning of said Raman laser and said mixer by varying said magnetic field.

8. Apparatus as claimed in claim 1, said charge carriers in said mixing material having magnetic moments greater than 10 times that of a free electron.

9. Apparatus as claimed in claim 1, said charge carriers in said mixing material having a Raman coupling cross-section greater than 1000 times that of a free electron.

10. Apparatus as claimed in claim 1, said mixing material having a narrow resonance in said spin-flip transition less than 0.03 $cm^{-1}$ in width.

11. Apparatus as claimed in claim 1, said mixing material being a semiconductor crystal with gap energy between valence and conduction bands less than 0.5 ev, and said charge carriers being mobile carriers in said crystal.

12. Apparatus as claimed in claim 11, frequency $f_1$ corresponding to an energy slightly less than said gap energy.

13. Apparatus as claimed in claim 11, said mobile charge carriers lying in a non-degenerate energy band of said crystal.

14. Apparatus as claimed in claim 13, said crystal being composed of n-doped, type III–V semiconductor material, and said carriers being electrons in the conduction band thereof.

15. Apparatus as claimed in claim 14, said crystal being composed of Indium Antimonide.

16. Apparatus as claimed in claim 15, said source including a CO laser for generating frequency $f_1$.

17. Apparatus as claimed in claim 6, said lasing material and said mixing material being distinct from one another.

18. Apparatus as claimed in claim 1, said mixing material being a crystal of n-doped Indium Antimonide, said carriers being electrons in the conduction band thereof, the doping of said mixing material being such that the plasma frequency therein is less than $f_o$, said source including a Raman laser the lasing material therein being a crystal of n-doped Indium Antimonide doped at a higher level than said mixing material crystal, said source also including a CO laser for generating radiation of frequency $f_1$ propagating at right angles to said magnetic field to stimulate said lasing crystal to generate radiation of frequency $f_2$, said magnet being arranged to permeate said lasing material with a magnetic field of the same strength as that permeating said mixing material and governed by controls operatively connected to effect variation of the field strength for tracked tuning of the output of said source and the spin-flip resonance of said mixer.

19. A method for providing an output from precession of charge carriers with a spin-flip transition to a station for use comprising the steps permeating with a magnetic field mixing material containing therein charge carriers with magnetic moments and resonant in a spin-flip, magnetic dipole transition with energy $E_t$ dependent on the magnetic field permeating said mixing material, maintaining said mixing material cold, to bias said carriers into their lower spin state, concurrently illuminating said mixing material with a first coherent stimulating radiation of frequency $f_1$ and a second coherent stimulating radiation of frequency $f_2$, less than $f_1$ the difference between $f_1$ and $f_2$ corresponding to said transition energy $E_t$, said stimulating radiations being polarized such that their respective electric vectors have a vector product angled to said magnetic field, thereby resonantly driving said carriers in precession about said field and causing said carriers to act as oscillating magnetic dipoles with an output of frequency $f_o$, and transmitting said output of frequency $f_o$ over an optical path transmissive thereto to said station, coupling said output to apparatus responsive thereto for control of said apparatus.

20. A method as claimed in claim 19 including stimulating with plane polarized radiation of frequency $f_1$ a Raman lasing material similar to said mixing material and equally permeated by said field to cause said Raman lasing material to emit radiation of frequency $f_2$ polarized at right angles to said radiation of frequency $f_1$, varying said magnetic field to effect simultaneous variation of the difference frequency $f_1-f_2$ derived from said Raman lasing material and of the transition energy $E_t$ in said mixing material and thereby varying the output at frequency $f_o$ while resonantly driving said carriers in said mixing material.

21. A far infrared coherent radiation source comprising a sample of a semiconductive material transmissive in both a first frequency range above about 30,000 GHz and in a second frequency range between about 300 GHz and 30,000 GHz, means for applying a magnetic field to said sample to provide a spin-flip frequency in said second frequency range and means for pumping said sample with at least a first coherent beam of radiation in said first frequency range, said sample and said pumping means being mutually oriented for generation of at least a coherent radiation at the spin-flip frequency in a three-frequency interaction.

22. A far infrared coherent radiation source according to claim 21 in which the pumping means comprises sources of first and second coherent beams in the first frequency range, said sources supplying beams having a frequency difference equal to the spin-flip frequency and having mutually orthogonal polarizations.

23. A far infrared coherent radiation source comprising semiconductive material transmissive in both a first frequency range above about 30,000 GHz and in a second frequency range between about 300 GHz and 30,000 GHz, means for applying a magnetic field to said material to provide a spin-flip frequency in said second frequency range, means for pumping said material with a coherent beam of radiation in said first frequency range to drive both laser action at a frequency that is Raman shifted from the pump frequency by the spin-reversal frequency and to drive a second coherent radiation at said spin-flip frequency.

* * * * *